Patented Jan. 9, 1951

2,537,763

UNITED STATES PATENT OFFICE 2,537,763

PREPARATION OF ORGANOSILANES

Dallas T. Hurd, Schenectady, N. Y., assignor to General Electric Company, a corporation of New York No Drawing. Application February 8, 1950, Serial No. 143,149

4 Claims. (Cl. 260—448.2)

This invention is concerned with the preparation of organosilanes. More particularly, the invention is concerned with the preparation of alkyl silanes containing Si-C bonds in which the alkyl groups have from 2 to 5 carbon atoms, which method comprises effecting reaction between (1) an aliphatic olefin (i. e., an unsaturated aliphatic hydrocarbon comprising an olefin containing an ethylenic double bond) containing from 2 to 5 carbon atoms and (2) monosilane ($SiH_4$).

In U. S. Patent 2,379,821 is disclosed the reaction between an olefin and an inorganic silicon halide which may have attached to its silicon atom at least one hydrogen. It has been found that the reaction between these two ingredients requires elevated temperatures and, in many cases, certain catalysts. I have now discovered that I am able to employ relatively low temperatures to form alkyl silanes by using a silane which is completely free of halogen substitution and an aliphatic olefin containing from 2 to 5 carbon atoms. Among such olefins may be mentioned ethylene, propylene, butylene, isobutylene, amylene, etc. The higher the olefin employed in my invention the more readily is it reactive with the $SiH_4$ to give greater substitution.

I have found that reaction between the silane and the aliphatic olefin takes place at quite low temperatures, for example, from 25° to 250° C., preferably from 75° to 200° C. In addition, no catalyst is necessary although one may be employed if desired, such as, for instance, the boron halides, the aluminum halides, etc.

Although the reactants may be passed simultaneously through a heated zone, I have found it eminently suitable to mix the ingredients in a pressure vessel or reactor and heat the contents thereof until essentially all the silane has been converted.

As will be apparent to those skilled in the art, the ratio of silane to olefin may be varied within wide limits without departing from the scope of the invention. Generally I prefer to use the olefin in a molar excess of the silane. Thus, I may use from 1 to 4 or more mols of the olefin per mol of the silane, depending on the number of hydrocarbon radicals it is desired to introduce into the organosilane. Generally, it is desirable to employ a molar excess of the olefin in order to insure completion of the reaction.

In order that those skilled in the art may better understand how the present invention may be practiced, the following examples are given by way of illustration and not by way of limitation. All parts are by weight.

Example 1

In this example, a mixture of 1 part monosilane and 15 parts ethylene were charged to a pressure reactor, the reactor closed and heated at a temperature of 120° C. for about 24 hours. No catalyst was employed. The resulting product was fractionally distilled in a Podbielniak column to yield ethylsilane ($H_3SiC_2H_5$) having a boiling point of around −55.5° C. An analysis of this compound in a mass spectrometer established that this compound had actually been obtained. In addition to the monomethyl derivative, there was also obtained a higher boiling material comprising higher alkylated silicon compounds, for instance, the di- and triethylsilanes.

Example 2

In this example, a mixture of about 14 parts isobutylene and 1 part monosilane was heated in a sealed pressure reactor at 100° C. for 20 hours. At the end of this time, the isolated product, which was liquid at room temperature, was hydrolyzed in a mixture of ether and ice containing a small amount of NaOH. Separation of the ether layer and evaporation of the ether left an oily material which burned to give a residue of $SiO_2$ proving the existence of C-Si bonds with the probable formation of an isobutyl silane comprising silicon and a silicon-bonded isobutyl radical.

Example 3

The same mixture of ingredients as employed in Example 2 was used in this example with the exception that the heating in the pressure reactor was for a period of 17 hours at 100° C. At the end of this time, the unreacted isobutylene was permitted to escape and the oily product which was liquid at room temperature was isolated. Treatment of this liquid oily product with NaOH showed no reaction at all, establishing that all the $SiH_4$ had disappeared and that the liquid product comprised what was believed to be essentially tetraisobutylsilane ($C_4H_9)_4Si$.

It will, of course, be apparent to those skilled in the art that in addition to the olefins employed in the foregoing examples other olefins may be used in their place, many examples of which have been given previously, without departing from the scope of the invention. In addition, variations in the conditions of the reaction may also be used.

The compositions prepared in accordance with my process have utility as intermediates in the preparation of other compositions. Thus, the incompletely alkylated silanes may be hydrolyzed to form alkyl polysiloxanes which can be used in making resins, oils, and rubbers. The alkyl silanes may also be added to hydrocarbon oils to prevent foaming thereof or they may be added to various pigmented paints to prevent separation of flocculation of the pigment.

What I claim as new and desire to secure by Letters Patent of the United States is:

1. The method of making an alkyl silane which comprises reacting monosilane with an olefin having one ethylenic double bond and containing from two to five carbon atoms.

2. The process for making ethyl silane which comprises reacting under heat monosilane with ethylene.

3. The process for making isobutyl silane which comprises reacting under heat monosilane with isobutylene.

4. The process for making an ethyl silane which comprises reacting at a temperature of from 25° to 250° C. monosilane with ethylene.

DALLAS T. HURD.

No references cited.

Disclaimer 2,537,763.—*Dallas T. Hurd*, Schenectady, N. Y. PREPARATION OF ORGANO-SILANES. Patent dated Jan. 9, 1951. Disclaimer filed Jan. 10, 1952, by the assignee, *General Electric Company*.

Hereby enters this disclaimer to claims 1 and 2 of said patent.

[*Official Gazette March 4, 1952.*]